April 25, 1950      W. F. DAVIS      2,505,102
ANTISKID DEVICE FOR AUTO TIRES

Filed Feb. 9, 1948      2 Sheets-Sheet 1

W. F. Davis
INVENTOR

BY *CA Snow & Co.*
ATTORNEYS.

April 25, 1950 W. F. DAVIS 2,505,102
ANTISKID DEVICE FOR AUTO TIRES
Filed Feb. 9, 1948 2 Sheets-Sheet 2

W. F. Davis
INVENTOR
BY *C. A. Snow & Co.*
ATTORNEYS.

Patented Apr. 25, 1950

2,505,102

UNITED STATES PATENT OFFICE 2,505,102

ANTISKID DEVICE FOR AUTO TIRES

William F. Davis, Westport, N. Y.

Application February 9, 1948, Serial No. 7,135

1 Claim. (Cl. 152—242)

This invention relates to an anti-skid device designed for use on motor vehicle tires, the primary object of the invention being to provide an anti-skid device which may be readily and easily mounted on a motor vehicle wheel, eliminating the necessity of jacking up the wheel or laying out the chain to run thereon, when mounting.

An important object of the invention is to provide an anti-skid device of this character including a pair of semi-rigid split ring members constructed to fit on opposite sides of a tire, the ring members providing the support for the cross chains which are held in such positions that they will not become tangled when the chains are removed and stored.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Figure 1:
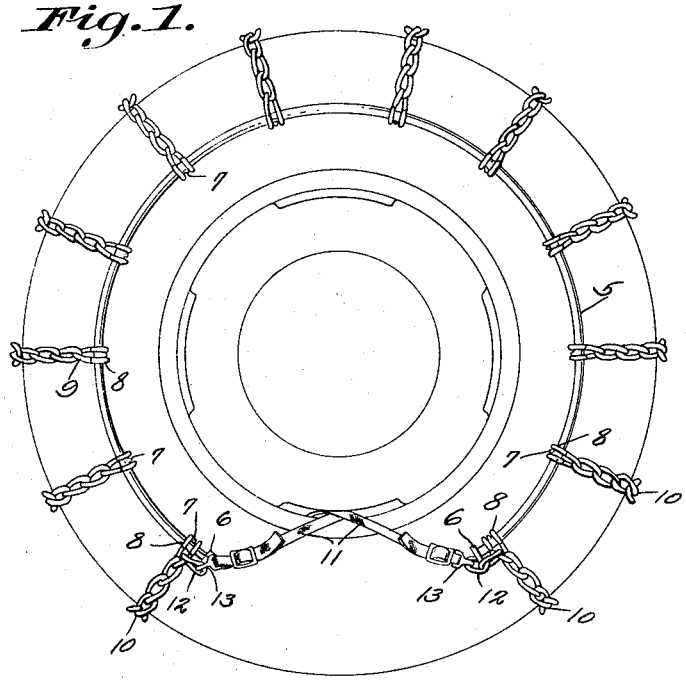
Figure 1 is an elevational view illustrating an anti-skid device, constructed in accordance with the invention.
Figure 2:
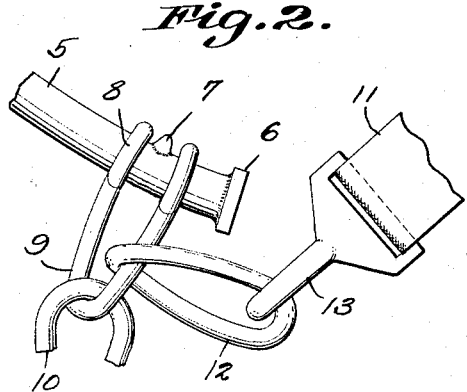
Fig. 2 is an enlarged elevational view illustrating one end of one of the split ring members and one end of a securing strap which connects therewith.
Figure 3:
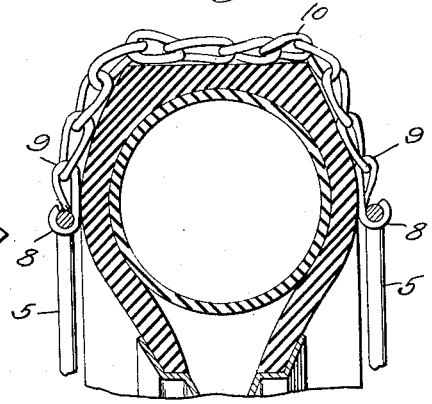
Fig. 3 is a transverse sectional view through a tire illustrating an anti-skid device constructed in accordance with the invention, as mounted thereon.
Figure 4:
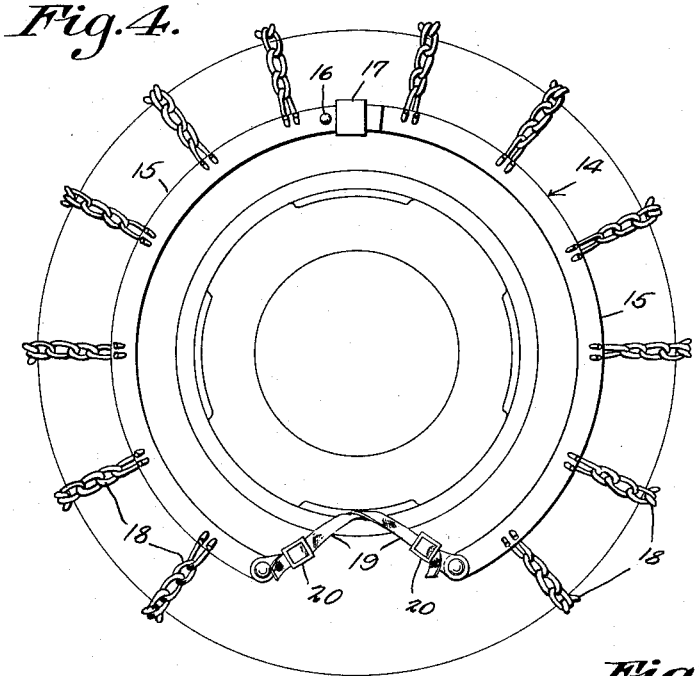
Fig. 4 is a side elevational view of a modified form of split ring.

Referring to the drawings in detail, in the preferred form of the invention, I provide a pair of split ring sections 5 which are constructed of semi-rigid material, with heads 6 at the ends thereof. These split rings are of such lengths that the ends will be spaced appreciable distances apart, to permit the rings to be firmly secured and adjusted to the wheel.

Secure to the side of the split ring sections, are lugs 7 that provide stops for the eye ends 8 of the links 9, thereby preventing the links 9 from sliding longitudinally of the ring sections when the strain is brought to bear thereon by the rotation of the wheel on which the anti-skid device is mounted.

The links 9 provide the end links for the cross chains 10 that overlie the tread of the tire to insure traction.

Figure 5:
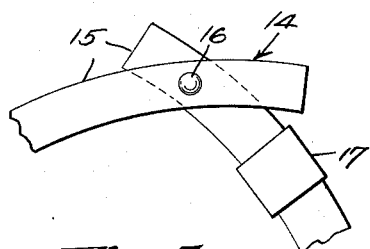
Fig. 5 is a fragmental enlarged elevational view illustrating the manner of securing the pivoted ring sections together.
Figure 6:
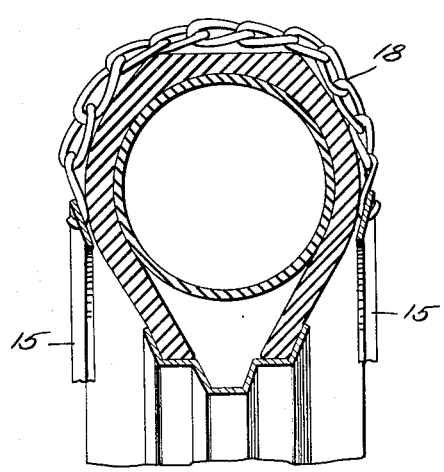
Fig. 6 is a transverse sectional view through a tire and rim, illustrating the modified form of anti-skid device, as mounted thereon.

Secured to the ends of the inner split ring section, or the ring section which is mounted on the inner side of the wheel, are straps 11, which straps are passed over the inner surface of the rim of the wheel, through the usual openings thereof, and crossed, where they are removably secured to the links 12 that connect with the links 9, as by means of the clips 13 which may be of any desirable quick acting type. In the form of the invention as shown by sheet 2 of the drawings, the split ring members are indicated by the reference character 14, and each of these rings comprises ring sections 15, which are pivotally connected at 16, at points in spaced relation with the ends of the sections, so that the sleeve 17 may be slid over the overlapping ends of the sections 15 to secure the sections in the formation of a ring. By sliding the sleeve 17 to the position as shown by Fig. 5 of the drawings, the ring sections may be folded providing a small and compact article for storage.

These split ring sections are constructed of rather wide metal so that they will lie flat against the sides of the tire and will not bite into the tire when in use.

In this form of the invention, the split ring members 14 are connected by means of the cross chains 18 which fit over the tread of the tire in the usual way.

The inner split ring member is provided with straps 19 connected with its ends, these straps passing through openings in the rim, where they cross each other and have their free ends secured to the ends of the opposite split ring member, by means of buckles 20.

From the foregoing it will be seen that due to the construction shown and described, I have provided an anti-skid device for positioning on motor vehicle wheels, which may be readily and easily mounted eliminating the necessity of jacking up the wheels or laying the chains adjacent to the wheels and running the wheels on the chains which are then moved over the wheel and secured.

By applicant's invention it is possible to place the split ring members over the wheel, with the ends of the split ring members disposed downwardly or adjacent to the supporting surface.

The straps may now be passed through the opening of the wheel, adjacent to the straps, where the straps are crossed and connected to the ends of the cooperating split ring section or the ring section at the outer side of the wheel.

In view of the foregoing detail disclosure, it is thought that a further description of the operation and utility of the device is unnecessary.

Having thus described the invention, what is claimed is:

An anti-skid device for vehicle wheels, comprising a pair of semi-rigid split ring sections adapted to be positioned on opposite sides of a tire, cross chains connecting the split ring sections and falling over the tread of the tire, straps secured to the ends of one of the sections, buckles secured to the ends of the opposite section, said straps of one ring section being crossed over the inner edge of the rim of the wheel over which the anti-skid device is positioned, the ends of said straps being secured to the buckles of the opposite split ring member, securing the anti-skid device in position on a wheel.

WILLIAM F. DAVIS.

REFERENCES CITED

The following references are of record in the file of this patent:

UNITED STATES PATENTS

| Number | Name | Date |
|---|---|---|
| 1,299,082 | Willson | Apr. 1, 1919 |
| 1,745,273 | Romain | Jan. 28, 1930 |
| 2,427,973 | Merritt | Sept. 23, 1947 |
| 2,436,709 | Bozenhard et al. | Feb. 24, 1948 |